United States Patent
Stulc et al.

(10) Patent No.: US 7,018,768 B2
(45) Date of Patent: Mar. 28, 2006

(54) ORGANOSOLS COMPRISING A CHROMOPHORE, METHODS AND USES

(75) Inventors: Leonard J. Stulc, Shafer, MN (US); Julie Y. Qian, Woodbury, MN (US); James A. Baker, Hudson, WI (US)

(73) Assignee: Samsung Electronics Company, Suwon (KR)

( * ) Notice: Subject to any disclaimer, the term of this patent is extended or adjusted under 35 U.S.C. 154(b) by 0 days.

(21) Appl. No.: 10/612,443

(22) Filed: Jun. 30, 2003

(65) Prior Publication Data

US 2004/0265724 A1   Dec. 30, 2004

(51) Int. Cl.
*G03G 9/13* (2006.01)

(52) U.S. Cl. ............. 430/114; 430/137.15; 430/137.22

(58) Field of Classification Search ............... 430/114, 430/137.15, 137.22
See application file for complete search history.

(56) References Cited

U.S. PATENT DOCUMENTS

| | | | |
|---|---|---|---|
| 3,990,980 A | 11/1976 | Kosel | 252/62.1 |
| 4,476,210 A | 10/1984 | Croucher et al. | 430/114 |
| 4,614,521 A | 9/1986 | Niwa et al. | 8/471 |
| 4,766,049 A | 8/1988 | Croucher et al. | 430/115 |
| 4,775,748 A | 10/1988 | Kluger et al. | 534/729 |
| 4,795,794 A | 1/1989 | Winnik et al. | 526/259 |
| 4,816,370 A | 3/1989 | Croucher et al. | 430/115 |
| 4,830,945 A | 5/1989 | Wong et al. | 430/114 |
| 4,985,546 A | 1/1991 | Miley et al. | 534/729 |
| 5,082,938 A | 1/1992 | Kluger et al. | 544/38 |
| 5,108,864 A | 4/1992 | Kato et al. | 430/114 |
| 5,166,326 A | 11/1992 | Smith et al. | 534/701 |
| 5,290,921 A | 3/1994 | Moody et al. | 534/607 |
| 5,434,030 A | 7/1995 | Smith et al. | 430/106 |
| 5,482,809 A | 1/1996 | Rao et al. | 430/114 |
| 5,530,053 A | 6/1996 | Rao et al. | 524/462 |
| 5,530,067 A | 6/1996 | Rao et al. | 525/274 |
| 5,599,886 A | 2/1997 | Smith et al. | 526/90 |
| 5,663,024 A | 9/1997 | Smith et al. | 430/97 |
| 5,919,846 A | 7/1999 | Batlaw et al. | 524/83 |
| 6,001,524 A | 12/1999 | Yoon et al. | 430/106 |
| 6,025,412 A * | 2/2000 | Sacripante et al. | 523/161 |
| 6,077,927 A | 6/2000 | Stephens et al. | 528/77 |
| 6,664,311 B1 * | 12/2003 | Batlaw | 523/160 |

FOREIGN PATENT DOCUMENTS

| | | |
|---|---|---|
| EP | 0 630 921 | 12/1994 |
| WO | WO 01/44330 | 6/2001 |
| WO | WO 01/79363 | 10/2001 |

OTHER PUBLICATIONS http://www.millikenchemical.com/html/reac_p.html "Reactint® Colorants" (1 pg).
http://dogwoodproductions.com/livepull/milchemadd.html "Reactint® Colorants" (1 pg.).
Milliken Chemical "Reactint®" Product Brochure, "Milliken invents an entirely new way to color urethanes." (12 pgs.).
Milliken Chemical "Reactint® Black X41LV" MSDS No. 369455, pp. 1-4 (Jan. 9, 2003).
European Search Report, EP 04 25 3865 and Annex dated Oct. 7, 2004.

* cited by examiner

*Primary Examiner*—John L Goodrow
(74) *Attorney, Agent, or Firm*—Kagan Binder, PLLC

(57) ABSTRACT

Amphipathic copolymers are provided comprising one or more S portions and one or more D portions. The copolymers have a chromophore covalently bonded thereto via a urethane, urea or amide linkage. These copolymers provide exceptionally useful components in toner compositions, because they provide easily prepared color-imparting particles that provide excellent color rendition.

24 Claims, No Drawings

ORGANOSOLS COMPRISING A CHROMOPHORE, METHODS AND USES

FIELD OF THE INVENTION

The present invention relates to organosols comprising a chromophore. More specifically, the present invention relates to organosols having a chromophore covalently linked thereto by a urethane linkage.

BACKGROUND

In electrophotographic and electrostatic printing processes (collectively electrographic processes), an electrostatic image is formed on the surface of a photoreceptive element or dielectric element, respectively. The photoreceptive element or dielectric element may be an intermediate transfer drum or belt or the substrate for the final toned image itself, as described by Schmidt, S. P. and Larson, J. R. in Handbook of Imaging Materials Diamond, A. S., Ed: Marcel Dekker: New York; Chapter 6, pp 227–252, and U.S. Pat. Nos. 4,728,983, 4,321,404, and 4,268,598.

In electrostatic printing, a latent image is typically formed by (1) placing a charge image onto a dielectric element (typically the receiving substrate) in selected areas of the element with an electrostatic writing stylus or its equivalent to form a charge image, (2) applying toner to the charge image, and (3) fixing the toned image. An example of this type of process is described in U.S. Pat. No. 5,262,259.

In electrophotographic printing, also referred to as xerography, electrophotographic technology is used to produce images on a final image receptor, such as paper, film, or the like. Electrophotographic technology is incorporated into a wide range of equipment including photocopiers, laser printers, facsimile machines, and the like.

Electrophotography typically involves the use of a reusable, light sensitive, temporary image receptor, known as a photoreceptor, in the process of producing an electrophotographic image on a final, permanent image receptor. A representative electrophotographic process involves a series of steps to produce an image on a receptor, including charging, exposure, development, transfer, fusing, and cleaning, and erasure.

In the charging step, a photoreceptor is covered with charge of a desired polarity, either negative or positive, typically with a corona or charging roller. In the exposure step, an optical system, typically a laser scanner or diode array, forms a latent image by selectively discharging the charged surface of the photoreceptor in an imagewise manner corresponding to the desired image to be formed on the final image receptor. In the development step, toner particles of the appropriate polarity are generally brought into contact with the latent image on the photoreceptor, typically using a developer electrically-biased to a potential opposite in polarity to the toner polarity. The toner particles migrate to the photoreceptor and selectively adhere to the latent image via electrostatic forces, forming a toned image on the photoreceptor.

In the transfer step, the toned image is transferred from the photoreceptor to the desired final image receptor; an intermediate transfer element is sometimes used to effect transfer of the toned image from the photoreceptor with subsequent transfer of the toned image to a final image receptor. In the fusing step, the toned image on the final image receptor is heated to soften or melt the toner particles, thereby fusing the toned image to the final receptor. An alternative fusing method involves fixing the toner to the final receptor under high pressure with or without heat. In the cleaning step, residual toner remaining on the photoreceptor is removed.

Finally, in the erasing step, the photoreceptor charge is reduced to a substantially uniformly low value by exposure to light of a particular wavelength band, thereby removing remnants of the original latent image and preparing the photoreceptor for the next imaging cycle.

Two types of toner are in widespread, commercial use: liquid toner and dry toner. The term "dry" does not mean that the dry toner is totally free of any liquid constituents, but connotes that the toner particles do not contain any significant amount of solvent, e.g., typically less than 10 weight percent solvent (generally, dry toner is as dry as is reasonably practical in terms of solvent content), and are capable of carrying a triboelectric charge. This distinguishes dry toner particles from liquid toner particles in that liquid toner particles are solvatable to some degree, typically in more than 50 weight percent of a low polarity, low dielectric carrier solvent; and liquid toner particles are generally chemically charged using polar groups that dissociate in the carrier solvent, but do not carry a triboelectric charge while solvated and/or dispersed in the liquid carrier.

A typical dry toner particle generally comprises a polymeric binder and optionally a visual enhancement additive, e.g., a colored pigment particle. The binder fulfills functions both during and after the electrophotographic process. With respect to processability, the character of the binder impacts the triboelectric charging and charge retention characteristics, flow, and fusing characteristics of the toner particles. These characteristics are important to achieve good performance during development, transfer, and fusing. After an image is formed on the final receptor, the nature of the binder (e.g. glass transition temperature, melt viscosity, molecular weight) and the fusing conditions (e.g. temperature, pressure and fuser configuration) impact durability (e.g. blocking and erasure resistance), adhesion to the receptor, gloss, and the like.

For example, polymeric materials suitable for use in dry toner particles typically have a high glass transition temperature ($T_g$) of at least about 50–65° C. in order to obtain good blocking resistance after fusing, yet typically require high fusing temperatures of about 200–250° C. in order to soften or melt the toner particles and thereby adequately fuse the toner to the final image receptor. High fusing temperatures are a disadvantage for dry toner because of the long warm-up time and higher energy consumption associated with high temperature fusing and because of the risk of fire associated with fusing toner to paper at temperatures approaching the autoignition temperature of paper (233° C.).

In addition, some dry toners using high $T_g$ polymeric binders are known to exhibit undesirable partial transfer (offset) of the toned image from the final image receptor to the fuser surface at temperatures above or below the optimal fusing temperature, requiring the use of low surface energy materials in the fuser surface or the application of fuser oils to prevent offset. Alternatively, various lubricants or waxes have been physically blended into the dry toner particles during fabrication to act as release or slip agents; however, because these waxes are not chemically bonded to the polymeric binder, they may adversely affect triboelectric charging of the toner particle or may migrate from the toner particle and contaminate the photoreceptor, an intermediate transfer element, the fuser element, or other surfaces critical to the electrophotographic process. In addition to the visual enhancement additive and the polymeric binder, dry toner particles may optionally include other additives.

Charge control additives (charge directors, charge control agents or CCA's) are often used in dry toner when the other ingredients, by themselves, do not provide the desired triboelectric charging or charge retention properties. As noted above, release or slip agents may be used to help prevent the toner from sticking to fuser rolls when those are used, thereby preventing or reducing offset. Other additives include antioxidants, ultraviolet stabilizers, fungicides, bactericides, flow control agents, and the like.

Dry toner particles have been manufactured using a wide range of fabrication techniques. One widespread fabrication technique involves melt mixing the ingredients, comminuting the solid blend that results to form particles, and then classifying the resultant particles to remove fines and larger material of unwanted particle size. External additives may then be blended with the resultant particles. This approach has drawbacks. First, the approach necessitates the use of polymeric binder materials that are friable or fracturable to some degree so that comminution can be carried out. This limits the kinds of polymeric materials that can be used, including materials that are fracture resistant and highly durable. This also limits the kinds of colorants to be used, in that some materials such as metal flakes, or the like, may tend to be damaged to too large a degree by the energy encountered during comminution.

The amount of energy required by comminution itself is a drawback in terms of equipment demands and associated manufacturing expenses. Also, material usage is inefficient in that fines and larger particles are unwanted and must be screened out from the desired product. In short, significant material is wasted. Recycling of unused material is not always practical to reduce such waste inasmuch as the composition of recycled material may tend to shift from what is desired.

Relatively recently, chemically grown dry toner materials have been made using a variety of methods. In such methods, the polymeric binder is typically manufactured as a dispersion in aqueous media by solution, suspension, or emulsion polymerization techniques under conditions that form monodisperse, polymeric particles that are fairly uniform in size and shape. After the polymeric binder is formed, it is filtered and washed to remove unreacted monomer, surfactants and other extraneous material, then dried and combined with other desired ingredients to form a dry toner powder. Because the high boiling point and large latent heat of vaporization of water makes it impractical and expensive to evaporate all of the aqueous media to obtain a dry polymeric binder, drying of the binder is often effected by filtration to remove a substantial amount of the water, followed by evaporative drying to remove substantially all of the remaining aqueous media.

A typical liquid toner composition generally includes toner particles suspended or dispersed in a liquid carrier. The liquid carrier is typically nonconductive dispersant, to avoid discharging the latent electrostatic image.

Liquid toner particles are generally solvated to some degree in the liquid carrier (or carrier liquid), typically in more than 50 weight percent of a low polarity, low dielectric constant, substantially nonaqueous carrier solvent. Liquid toner particles are generally chemically charged using polar groups that dissociate in the carrier solvent, but do not carry a triboelectric charge while solvated and/or dispersed in the liquid carrier. Liquid toner particles are also typically smaller than dry toner particles. Because of their small particle size, ranging from about 5 microns to sub-micron, liquid toners are capable of producing very high-resolution toned images.

A typical toner particle for a liquid toner composition generally comprises a visual enhancement additive (for example, a colored pigment particle) and a polymeric binder. The polymeric binder fulfills functions both during and after the electrophotographic process. With respect to processability, the character of the binder impacts charging and charge stability, flow, and fusing characteristics of the toner particles. These characteristics are important to achieve good performance during development, transfer, and fusing. After an image is formed on the final receptor, the nature of the binder (e.g. glass transition temperature, melt viscosity, molecular weight) and the fusing conditions (e.g. temperature, pressure and fuser configuration) impact durability (e.g. blocking and erasure resistance), adhesion to the receptor, gloss, and the like.

Polymeric binder materials suitable for use in liquid toner particles typically exhibit glass transition temperatures of about −24° C. to 55° C., which is lower than the range of glass transition temperatures (50–100° C.) typical for polymeric binders used in dry toner particles. In particular, some liquid toners are known to incorporate polymeric binders exhibiting glass transition temperatures ($T_g$) below room temperature (25° C.) in order to rapidly self fix, e.g., by film formation, in the liquid electrophotographic imaging process; see e.g. U.S. Pat. No. 6,255,363. However, such liquid toners are also known to exhibit inferior image durability resulting from the low $T_g$ (e.g. poor blocking and erasure resistance) after fusing the toned image to a final image receptor.

In other printing processes using liquid toners, self-fixing is not required. In such a system, the image developed on the photoconductive surface is transferred to an intermediate transfer belt ("ITB") or intermediate transfer member ("ITM") or directly to a print medium without film formation at this stage. See, for example, U.S. Pat. No. 5,410,392 to Landa, issued on Apr. 25, 1995; and U.S. Pat. No. 5,115,277 to Camis, issued on May 19, 1992. In such a system, this transfer of discrete toner particles in image form is carried out using a combination of mechanical forces, electrostatic forces, and thermal energy. In the system particularly described in the '277 patent, DC bias voltage is connected to an inner sleeve member to develop electrostatic forces at the surface of the print medium for assisting in the efficient transfer of color images.

The toner particles used in such a system have been previously prepared using conventional polymeric binder materials, and not polymers made using an organosol process. Thus, for example the '392 patent states that the liquid developer to be used in the disclosed system is described in U.S. Pat. No. 4,794,651 to Landa, issued on Dec. 27, 1988. This patent discloses liquid toners made by heating a preformed high $T_g$ polymer resin in a carrier liquid to an elevated temperature sufficiently high for the carrier liquid to soften or plasticize the resin, adding a pigment, and exposing the resulting high temperature dispersion to a high energy mixing or milling process.

Although such non self-fixing liquid toners using higher $T_g$ ($T_g$ generally greater than or equal to about 60° C.) polymeric binders should have good image durability, such toners are known to exhibit other problems related to the choice of polymeric binder, including image defects due to the inability of the liquid toner to rapidly self fix in the imaging process, poor charging and charge stability, poor stability with respect to agglomeration or aggregation in storage, poor sedimentation stability in storage, and the requirement that high fusing temperatures of about 200–250° C. be used in order to soften or melt the toner particles and thereby adequately fuse the toner to the final image receptor.

To overcome the durability deficiencies, polymeric materials selected for use in both nonfilm-forming liquid toners and dry toners more typically exhibit a range of $T_g$ of at least about 55–65° C. in order to obtain good blocking resistance after fusing, yet typically require high fusing temperatures of about 200–250° C. in order to soften or melt the toner particles and thereby adequately fuse the toner to the final image receptor.

Solvent-based polymer dispersions in a nonaqueous liquid (organosols) have been prepared using dispersion polymerization in low polarity, low dielectric constant carrier solvents for use in making relatively low glass transition temperature ($T_g \leq 30°$ C.) film-forming liquid electrophotographic toners. See, e.g., U.S. Pat. Nos. 5,886,067 and 6,103,781. Organosols have also been prepared for use in making intermediate glass transition temperature ($T_g$ 30–55° C.) liquid electrostatic toners for use in electrostatic stylus printers. See e.g. U.S. Pat. No. 6,255,363 B1.

Some solvent-based polymer dispersions have also been developed for producing dry toners. See, e.g., U.S. Pat. Nos. 6,136,490 and 5,384,226 and Japanese Published Patent Document No. 05-119529. Unfortunately, the use of organosols or solvent-based polymer dispersion to make dry toner particles has proved to be substantially more challenging than the use of organosols to make liquid toner compositions. When a solvent-based dispersion is dried to remove the nonaqueous liquid carrier as is necessary to make dry toner particles, the binder particles tend to agglomerate and/or aggregate into one or more large masses. Such masses must be pulverized or otherwise comminuted in order to obtain dry toner particles of an appropriate size. The need for such comminution defeats a major advantage of using organosols in the first instance, which is the formation of substantially monodisperse, polymeric particles of uniform size and shape. In addition, it has been reported to be more difficult to incorporate slip agents (e.g. waxes) or triboelectric charge control additives (CCA's) into nonaqueous dispersions due to solubility constraints and other considerations. Consequently, the full spectrum of benefits that result from using organosols has not been realized for widespread, commercial, dry toner applications.

Particle size and charge characteristics are especially important to form high quality images with good resolution using toners. Toner particles must be as uniform in size, charge rate, and charge holding characteristics as is practically possible in order to maximize image forming performance. Accordingly, there is always a demand in this industry for techniques that yield toner particles with more uniform particle size, charging rate, and/or charge holding characteristics. There is also a demand for new polymeric binders for. toners that exhibit controllable particle size, shape and charge polarity; improved charging characteristics and charge stability; improved low temperature fusing performance; and lower manufacturing cost arising from improved yields, reduced processing steps, or more efficient processing methods.

U.S. Pat. No. 5,663,024 to Smith describes liquid toners for electrophotography comprising polymeric dyes. In these toners, the polymeric dye contains macromeric moieties that render the polymeric dye dispersible in hydrocarbon solvents and additionally contains segments that impart color. The polymeric dye may contain either a charge-directing chelating moiety or a surface-release promoting moiety, or both of these moieties. Polymeric dyes as described therein are classified in two classes: (1) backbone polymeric dyes and (2) pendent polymeric dyes. Smith further states that there are two general methods for preparing pendent polymeric dyes: (1) the polymerization of a monomer containing a pendent chromophore, and (2) the reaction of a pre-formed polymer with a reactive dye or reactive dye developer. The dyes produced by method (1) are stated to be typically made by copolymerization of a free radically polymerizable monomer having a chromophore and a colorless free radically polymerizable monomer. Suitable free radically polymerizable monomers containing a chromophore are stated to be known in the art, citing U.S. Pat. No. 4,614,521 section [D] as disclosing "sublimable dyes having an acryloyl or a methacryloyl group." Another list of dyes containing acryloyl or methacryloyl groups are stated to be found in U.S. Pat. No. 4,795,794.

Reactive colorants for use in polyurethane resins are described in U.S. Pat. No. 4,775,748 to Kluger, assigned to Milliken Research Corporation. These colorants are disclosed to be incorporated into resin during the formation of polyurethanes. The products of the invention as disclosed are stated to be particularly useful for production of colored polyurethane foams. Additionally, Reactint® Colorants are sold by Milliken Chemical and are described on their website at http://www.millikenchemical.com/html/reac_f-.html as polyols to which color molecules are attached, based on a technology proprietary to Milliken Chemical. These materials are stated to be the most widely used products for coloring polyurethane in the world.

SUMMARY OF THE INVENTION

The present invention relates to amphipathic copolymers comprising one or more S portions and one or more D portions. The, copolymers have a chromophore covalently bonded thereto via a urethane, urea or amide linkage. These copolymers provide exceptionally useful components in toner compositions, because they provide easily prepared color-imparting particles that provide excellent color rendition. More specifically, it has been found that chromophores may be easily covalently bonded to amphipathic copolymers through chemical linkages that are resilient. Thus, colored particles of the present invention exhibit good performance properties even when exposed to shear conditions, such as may be required under handling or milling operations, for example to reduce agglomerations or particle size. Advantageously, it has been found that there is a wide availability of reactive dyes suitable for incorporation into the amphipathic copolymers of the present invention. Further many dyes either contain the desired reactive functionalities or may be readily modified to incorporate the desired reactive functionality, with the final particle exhibiting little or no color shift from the starting dye material. Thus, toner compositions may be readily prepared in accordance with the present invention using off-the-shelf, or near off-the-shelf dye materials. Additionally, because many suitable dye starting materials are available, it is possible to readily select non-toxic and non hazardous starting materials for preparation of the toners of the present invention.

As a particular advantage, the amphipathic copolymer comprising covalently bonded chromophores of the present invention do not require the use of pigment in the ultimate toner composition. Conventionally, pigments are used in toner compositions to provide the desired color rendition of the toner, and to produce the desired image. Pigments previously have been physically associated with the amphipathic copolymer by subjecting the copolymer to one or more high energy mixing processes. The dispersed copolymer or fragments derived from the copolymer then associate with the pigment particle, for example, by adsorbing to or adhering to the surface of the pigment. By use of the present invention, this high energy mixing process may be reduced or eliminated. Further, because the chromophore is covalently bonded to the amphipathic copolymer, the toner composition may be more stable, because no pigment will be dissociated from the amphipathic copolymer. Toners of the present invention that do not contain pigments therefore do not experience pigment separation from the binder. This is particularly beneficial in liquid toner embodiments, where sedimentation of pigment out of the toner composition may be a problem, particularly over long term storage of the toner product. Optionally, additional visual enhancement additives may be provided in the toner compositions of the present invention if desired. Incorporation of such additives, particularly pigments, may be desirable in certain embodiments where enhanced hiding power of the toner is required.

In a preferred embodiment of the present invention, amphipathic copolymers are prepared wherein a single color of chromophore is covalently bonded to the copolymer to provide a predetermined color. In another preferred embodiment of the present invention, amphipathic copolymers are prepared wherein a plurality of chromophores having different colors are covalently bonded to the copolymer to provide a predetermined blended color. Toner compositions thus can be prepared to provide excellent color renditions by providing a composition having only one type of chromophore present in the toner composition. Alternatively, the toner composition may comprise a plurality chromophores blended in a predetermined ratio to provide a toner composition having a predetermined blended color. These chromophores in one embodiment may be provided as a prereacted blend on each amphipathic copolymer (i.e. that each copolymer exhibits substantially the same color blend). Alternatively, chromophores of different colors may be reacted with separate amphipathic copolymers, with subsequent blending of the copolymers in predetermined ratios to exhibit the desired predetermined toner composition color.

As used herein, the term "amphipathic" is well known and refers to a copolymer having a combination of portions having distinct solubility and dispersibility characteristics, respectively, in a desired liquid carrier that is used to make the copolymer and/or used in the course of incorporating the copolymer into the dry toner particles. Preferably, the liquid carrier is selected such that at least one portion (also referred to herein as S material or portion(s)) of the copolymer is more solvated by the carrier while at least one other portion (also referred to herein as D material or portion(s)) of the copolymer constitutes more of a dispersed phase in the carrier.

In preferred embodiments, the copolymer is polymerized in situ in the desired substantially nonaqueous liquid carrier as this yields monodisperse copolymeric particles suitable for use in toner with little, if any, need for subsequent comminuting or classifying. The resulting organosol may optionally be mixed with visual enhancement additives and/or one or more other desired ingredients. During such combination, ingredients comprising the visual enhancement particles and the amphipathic copolymer will tend to self-assemble into composite toner particles. Specifically, it is believed that the D portion of the copolymer will tend to physically and/or chemically interact with the surface of the visual enhancement additive, while the S portion helps promote dispersion in the carrier without use of a separate surfactant or dispersant. In the case of dry toner embodiments of the present invention, the dispersion is then dried to the desired degree to provide composite dry toner particles, preferably using the fluidized drying techniques described herein.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Preferably, the nonaqueous liquid carrier of the organosol is selected such that at least one portion (also referred to herein as the S material or portion) of the amphipathic copolymer is more solvated by the carrier while at least one other portion (also referred to herein as the D material or portion) of the copolymer constitutes more of a dispersed phase in the carrier. Preferred copolymers of the present invention comprise S and D material having respective solubilities in the desired liquid carrier that are sufficiently different from each other such that the S blocks tend to be more solvated by the carrier while the D blocks tend to be more dispersed in the carrier. More preferably, the S blocks are soluble in the liquid carrier while the D blocks are insoluble. In particularly preferred embodiments, the D material phase separates from the liquid carrier, forming dispersed particles.

From one perspective, the polymer particles when dispersed in the liquid carrier may be viewed as having a core/shell structure in which the D material tends to be in the core, while the S material tends to be in the shell. The S material thus functions as a dispersing aid, steric stabilizer or graft copolymer stabilizer, to help stabilize dispersions of the copolymer particles in the liquid carrier. Consequently, the S material may also be referred to herein as a "graft stabilizer." The core/shell structure of the binder particles tends to be retained when the particles are dried and when incorporated into dry toner particles.

The solubility of a material, or a portion of a material such as a copolymeric portion, may be qualitatively and quantitatively characterized in terms of its Hildebrand solubility parameter. The Hildebrand solubility parameter refers to a solubility parameter represented by the square root of the cohesive energy density of a material, having units of (pressure)$^{1/2}$, and being equal to $(\Delta H/RT)^{1/2}/V^{1/2}$, where $\Delta H$ is the molar vaporization enthalpy of the material, R is the universal gas constant, T is the absolute temperature, and V is the molar volume of the solvent. Hildebrand solubility parameters are tabulated for solvents in Barton, A. F. M., *Handbook of Solubility and Other Cohesion Parameters,* 2d Ed. CRC Press, Boca Raton, Fla., (1991), for monomers and representative polymers in *Polymer Handbook,* 3rd Ed., J. Brandrup & E. H. lnnmergut, Eds. John Wiley, N.Y., pp 519–557 (1989), and for many commercially available polymers in Barton, A. F. M., *Handbook of Polymer-Liquid Interaction Parameters and Solubility Parameters*, CRC Press, Boca Raton, Fla., (1990).

The degree of solubility of a material, or portion thereof, in a liquid carrier may be predicted from the absolute difference in Hildebrand solubility parameters between the material, or portion thereof, and the liquid carrier. A material, or portion thereof, will be fully soluble or at least in a highly solvated state when the absolute difference in Hildebrand solubility parameter between the material, or portion thereof, and the liquid carrier is less than approximately 1.5 $MPa^{1/2}$. On the other hand, when the absolute difference between the Hildebrand solubility parameters exceeds approximately 3.0 $MPa^{1/2}$, the material, or portion thereof, will tend to phase separate from the liquid carrier, forming a dispersion. When the absolute difference in Hildebrand solubility parameters is between 1.5 $MPa^{1/2}$ and 3.0 $MPa^{1/2}$, the material, or portion thereof, is considered to be weakly solvatable or marginally insoluble in the liquid carrier.

Consequently, in preferred embodiments, the absolute difference between the respective Hildebrand solubility parameters of the S portion(s) of the copolymer and the liquid carrier is less than 3.0 $MPa^{1/2}$, preferably less than about 2.0 $MPa^{1/2}$, more preferably less than about 1.5 $MPa^{1/2}$. In a particularly preferred embodiment of the present invention, the absolute difference between the respective Hildebrand solubility parameters of the S portion(s) of the copolymer and the liquid carrier is from about 2 to about 3.0 $MPa^{1/2}$. Additionally, it is also preferred that the absolute difference between the respective Hildebrand solubility parameters of the D portion(s) of the copolymer and the liquid carrier is greater than 2.3 $MPa^{1/2}$, preferably greater than about 2.5 $MPa^{1/2}$, more preferably greater than about 3.0 $MPa^{1/2}$, with the proviso that the difference between the respective Hildebrand solubility parameters of the S and D portion(s) is at least about 0.4 $MPa^{1/2}$, more preferably at least about 1.0 $MPa^{1/2}$ Because the Hildebrand solubility of a material may vary with changes in temperature, such solubility parameters are preferably determined at a desired reference temperature such as at 25° C.

Those skilled in the art understand that the Hildebrand solubility parameter for a copolymer, or portion thereof, may be calculated using a volume fraction weighting of the individual Hildebrand solubility parameters for each monomer comprising the copolymer, or portion thereof, as described for binary copolymers in Barton A. F. M., *Handbook of Solubility Parameters and Other Cohesion Parameters*, CRC Press, Boca Raton, p 12 (1990). The magnitude of the Hildebrand solubility parameter for polymeric materials is also known to be weakly dependent upon the weight average molecular weight of the polymer, as noted in Barton, pp 446–448. Thus, there will be a preferred molecular weight range for a given polymer or portion thereof in order to achieve desired solvating or dispersing characteristics. Similarly, the Hildebrand solubility parameter for a mixture maybe calculated using a volume fraction weighting of the individual Hildebrand solubility parameters for each component of the mixture.

In addition, we have defined our invention in terms of the calculated solubility parameters of the monomers and solvents obtained using the group contribution method developed by Small, P. A., J. Appl. Chem., 3, 71 (1953) using Small's group contribution values listed in Table 2.2 on page VII/525 in the Polymer Handbook, 3rd Ed., J. Brandrup & E. H. Immergut, Eds. John Wiley, New York, (1989). We have chosen this method for defining our invention to avoid ambiguities which could result from using solubility parameter values obtained with different experimental methods. In addition, Small's group contribution values will generate solubility parameters that are consistent with data derived from measurements of the enthalpy of vaporization, and therefore are completely consistent with the defining expression for the Hildebrand solubility parameter. Since it is not practical to measure the heat of vaporization for polymers, monomers are a reasonable substitution.

For purposes of illustration, Table I lists Hildebrand solubility parameters for some common solvents used in an electrophotographic toner and the Hildebrand solubility parameters and glass transition temperatures (based on their high molecular weight homopolymers) for some common monomers used in synthesizing organosols.

TABLE I

Hildebrand Solubility Parameters

Solvent Values at 25° C.

| Solvent Name | Kauri-Butanol Number by ASTM Method D1133-54T (ml) | Hildebrand Solubility Parameter $(MPa^{1/2})$ |
|---|---|---|
| Norpar ™ 15 | 18 | 13.99 |
| Norpar ™ 13 | 22 | 14.24 |
| Norpar ™ 12 | 23 | 14.30 |
| Isopar ™ V | 25 | 14.42 |
| Isopar ™ G | 28 | 14.60 |
| Exxsol ™ D80 | 28 | 14.60 |

Source: Calculated from equation #31 of Polymer Handbook, 3rd Ed., J. Brandrup E. H. Immergut, Eds. John Wiley, NY, p. VII/522 (1989).

Monomer Values at 25° C.

| Monomer Name | Hildebrand Solubility Parameter $(MPa^{1/2})$ | Glass Transition Temperature (° C.)* |
|---|---|---|
| 3,3,5-Trimethyl Cyclohexyl Methacrylate | 16.73 | 125 |
| Isobornyl Methacrylate | 16.90 | 110 |
| Isobornyl Acrylate | 16.01 | 94 |
| n-Behenyl acrylate | 16.74 | <−55 (58 m.p.)** |
| n-Octadecyl Methacrylate | 16.77 | −100 (45 m.p.)** |
| n-Octadecyl Acrylate | 16.82 | −55 |
| Lauryl Methacrylate | 16.84 | −65 |
| Lauryl Acrylate | 16.95 | −30 |
| 2-Ethylhexyl Methacrylate | 16.97 | −10 |
| 2-Ethylhexyl Acrylate | 17.03 | −55 |
| n-Hexyl Methacrylate | 17.13 | −5 |
| t-Butyl Methacrylate | 17.16 | 107 |
| n-Butyl Methacrylate | 17.22 | 20 |
| n-Hexyl Acrylate | 17.30 | −60 |
| n-Butyl Acrylate | 17.45 | −55 |
| Ethyl Methacrylate | 17.62 | 65 |
| Ethyl Acrylate | 18.04 | −24 |
| Methyl Methacrylate | 18.17 | 105 |
| Styrene | 18.05 | 100 |

Calculated using Small's Group Contribution Method, Small, P.A. Journal of Applied Chemistry 3 p. 71 (1953). Using Group Contributions from Polymer Handbook, 3rd Ed., J. Brandrup E. H. Immergut, Eds., John Wiley, NY, p. VII/525 (1989).
*Polymer Handbook, 3rd Ed., J. Brandrup E. H. Immergut, Eds., John Wiley, NY, pp. VII/209–277 (1989). The $T_g$ listed is for the homopolymer of the respective monomer.
**m.p. refers to melting point for selected Polymerizable Crystallizable Compounds.

The liquid carrier is a substantially nonaqueous solvent or solvent blend. In other words, only a minor component (generally less than 25 weight percent) of the liquid carrier comprises water. Preferably, the substantially nonaqueous liquid carrier comprises less than 20 weight percent water, more preferably less than 10 weight percent water, even more preferably less than 3 weight percent water, most preferably less than one weight percent water.

The substantially nonaqueous carrier liquid may be selected from a wide variety of materials, or combination of materials, which are known in the art, but preferably has a Kauri-butanol number less than 30 ml. The liquid is preferably oleophilic, chemically stable under a variety of conditions, and electrically insulating. Electrically insulating refers to a dispersant liquid having a low dielectric constant and a high electrical resistivity. Preferably, the liquid dispersant has a dielectric constant of less than 5; more preferably less than 3. Electrical resistivities of carrier liquids are typically greater than $10^9$ Ohm-cm; more preferably greater than $10^{10}$ Ohm-cm. In addition, the liquid carrier desirably is chemically inert in most embodiments with respect to the ingredients used to formulate the toner particles.

Examples of suitable liquid carriers include aliphatic hydrocarbons (n-pentane, hexane, heptane and the like), cycloaliphatic hydrocarbons (cyclopentane, cyclohexane and the like), aromatic hydrocarbons (benzene, toluene, xylene and the like), halogenated hydrocarbon solvents (chlorinated alkanes, fluorinated alkanes, chlorofluorocarbons and the like) silicone oils and blends of these solvents. Preferred carrier liquids include branched paraffinic solvent blends such as Isopar™ G, Isopar™ H, Isopar™ K, Isopar™ L, Isopar™ M and Isopar™ V (available from Exxon Corporation, N.J.), and most preferred carriers are the aliphatic hydrocarbon solvent blends such as Norpar™ 12, Norpar™ 13 and Norpar™ 15 (available from Exxon Corporation, N.J.). Particularly preferred carrier liquids have a Hildebrand solubility parameter of from about 13 to about 15 $MPa^{1/2}$.

As used herein, the term "copolymer" encompasses both oligomeric and polymeric materials, and encompasses polymers incorporating two or more monomers. As used herein, the term "monomer" means a relatively low molecular weight material (i.e., generally having a molecular weight less than about 500 Daltons) having one or more polymerizable groups. "Oligomer" means a relatively intermediate sized molecule incorporating two or more monomers and generally having a molecular weight of from about 500 up to about 10,000 Daltons. "Polymer" means a relatively large material comprising a substructure formed two or more monomeric, oligomeric, and/or polymeric constituents and generally having a molecular weight greater than about 10,000 Daltons.

The term "macromer" or "macromonomer" refers to an oligomer or polymer having a terminal polymerizable moiety. "Polymerizable crystallizable compound" or "PCC" refers to compounds capable of undergoing polymerization to produce a polymer portion capable of undergoing reversible crystallization over a reproducible and well-defined temperature range (e.g. the copolymer exhibits a melting and freezing point as determined, for example, by differential scanning calorimetry). PCC's may include monomers, functional oligomers, functional pre-polymers, macromers or other compounds able to undergo polymerization to form a polymer portion copolymer. The term "molecular weight" as used throughout this specification means weight average molecular weight unless expressly noted otherwise.

The weight average molecular weight of the amphipathic copolymer of the present invention may vary over a wide range, and may impact imaging performance. The polydispersity of the copolymer also may impact imaging and transfer performance of the resultant dry toner material. Because of the difficulty of measuring molecular weight for an amphipathic copolymer, the particle size of the dispersed copolymer (organosol) may instead be correlated to imaging and transfer performance of the resultant dry toner material. Generally, the volume mean particle diameter ($D_v$) of the dispersed graft copolymer particles, determined by laser diffraction particle size measurement, should be in the range 0.1–100 microns, more preferably 0.5–50 microns, even more preferably 1.0–20 microns, and most preferably 3–10 microns.

In addition, a correlation exists between the molecular weight of the solvatable or soluble S portion of the graft copolymer, and the imaging and transfer performance of the resultant toner. Generally, the S portion of the copolymer has a weight average molecular weight in the range of 1000 to about 1,000,000 Daltons, preferably 5000 to 400,000 Daltons, more preferably 50,000 to 300,000 Daltons. It is also generally desirable to maintain the polydispersity (the ratio of the weight-average molecular weight to the number average molecular weight) of the S portion of the copolymer below 15, more preferably below 5, most preferably below 2.5. It is a distinct advantage of the present invention that copolymer particles with such lower polydispersity characteristics for the S portion are easily made in accordance with the practices described herein, particularly those embodiments in which the copolymer is formed in the liquid carrier in situ.

The relative amounts of S and D portions in a copolymer can impact the solvating and dispersability characteristics of these portions. For instance, if too little of the S portion(s) are present, the copolymer may have too little stabilizing effect to sterically-stabilize the organosol with respect to aggregation as might be desired. If too little of the D portion(s) are present, the small amount of D material may be too soluble in the liquid carrier such that there may be insufficient driving force to form a distinct, dispersed phase in the liquid carrier. The presence of both a solvated and dispersed phase helps the ingredients of particles self assemble in situ with exceptional uniformity among separate particles. Balancing these concerns, the preferred weight ratio of D material to S material is in the range of 1:20 to 20:1, preferably 1:1 to 15:1, more preferably 2:1 to 10:1, and most preferably 4:1 to 8:1.

Glass transition temperature, $T_g$, refers to the temperature at which a (co)polymer, or portion thereof, changes from a hard, glassy material to a rubbery, or viscous, material, corresponding to a dramatic increase in free volume as the (co)polymer is heated. The $T_g$ can be calculated for a (co)polymer, or portion thereof, using known $T_g$ values for the high molecular weight homopolymers (see, e.g., Table I herein) and the Fox equation expressed below:

$$1/T_g = w_1/T_{g1} + w_2/T_{g2} + \ldots w_i/T_{gi}$$

wherein each $w_n$ is the weight fraction of monomer "n" and each $T_{gn}$ is the absolute glass transition temperature (in degrees Kelvin) of the high molecular weight homopolymer of monomer "n" as described in Wicks, A. W., F. N. Jones & S. P. Pappas, Organic Coatings 1, John Wiley, NY, pp 54–55 (1992).

In the practice of the present invention, values of $T_g$ for the D or S portion of the copolymer were determined using the Fox equation above, although the $T_g$ of the copolymer as a whole may be determined experimentally using e.g. differential scanning calorimetry. The glass transition temperatures ($T_g$'s) of the S and D portions may vary over a wide range and may be independently selected to enhance manufacturability and/or performance of the resulting dry toner particles. The $T_g$'s of the S and D portions will depend to a large degree upon the type of monomers constituting such portions. Consequently, to provide a copolymer material with higher $T_g$, one can select one or more higher $T_g$ monomers with the appropriate solubility characteristics for the type of copolymer portion (D or S) in which the monomer(s) will be used. Conversely, to provide a copolymer material with lower $T_g$, one can select one or more lower $T_g$ monomers with the appropriate solubility characteristics for the type of portion in which the monomer(s) will be used.

For copolymers useful in dry toner applications, the copolymer $T_g$ preferably should not be too low or else receptors printed with the toner may experience undue blocking. Conversely, the minimum fusing temperature required to soften or melt the toner particles sufficient for them to adhere to the final image receptor will increase as. the copolymer $T_g$ increases. Consequently, it is preferred that the $T_g$ of the copolymer be far enough above the expected maximum storage temperature of a printed receptor so as to avoid blocking issues, yet not so high as to require fusing temperatures approaching the temperatures at which the final image receptor may be damaged, e.g. approaching the autoignition temperature of paper used as the final image receptor. In this regard, incorporation of a polymerizable crystallizable compound (PCC) in the copolymer will generally permit use of a lower copolymer $T_g$ and therefore lower fusing temperatures without the risk of the image blocking at storage temperatures below the melting temperature of the PCC. Desirably, therefore, the copolymer has a $T_g$ of 0°–100° C., more preferably 20°–80° C., most preferably 40°–70° C.

The advantages of incorporating PCC's into the copolymer are further described in assignee's co-pending U.S. patent application Ser. No. 10/612,535 titled ORGANOSOL INCLUDING AMPHIPATHIC COPOLYMERIC BINDER HAVING CRYSTALLINE MATERIAL, AND USE OF THE ORGANOSOL TO MAKE DRY TONER FOR ELECTROGRAPHIC APPLICATIONS, and filed on Jun. 30, 2003 in the names of Julie Y. Qian et al., the co-pending patent application being incorporated herein by reference in its entirety.

For copolymers in which the D portion comprises a major portion of the copolymer, the $T_g$ of the D portion will dominate the $T_g$ of the copolymer as a whole. For such copolymers useful in dry toner applications, it is preferred that the $T_g$ of the D portion fall in the range of 20°–105° C., more preferably 30°–85° C., most preferably 60°–75° C., since the S portion will generally exhibit a lower $T_g$ than the D portion, and a higher $T_g$ D portion is therefore desirable to offset the $T_g$ lowering effect of the S portion, which may be solvatable. In this regard, incorporation of a polymerizable crystallizable compound (PCC) in the D portion of the copolymer will generally permit use of a lower D portion $T_g$ and therefore lower fusing temperatures with reduced risk of image blocking at storage temperatures below the melting temperature of the PCC.

Blocking with respect to the S portion material is not as significant an issue inasmuch as preferred copolymers comprise a majority of the D portion material. Consequently, the $T_g$ of the D portion material will dominate the effective $T_g$ of the copolymer as a whole. However, if the $T_g$ of the S portion is too low, then the particles might tend to aggregate and/or aggregate during drying. On the other hand, if the $T_g$ is too high, then the requisite fusing temperature may be too high. Balancing these concerns, the S portion material is preferably formulated to have a $T_g$ of at least 0° C., preferably at least 20° C., more preferably at least 40° C. In this regard, incorporation of a polymerizable crystallizable compound (PCC) in the S portion of the copolymer will generally permit use of a lower S portion $T_g$ provided that the drying temperature used in forming the dry toner particles is maintained below the melting temperature of the PCC, e.g. by using vacuum assisted drying, freeze drying, low temperature fluidized bed drying, and the like.

It is understood that the requirements imposed on the self-fixing characteristics of a liquid toner will depend to a great extent upon the nature of the imaging process. For example, rapid self-fixing of the toner to form a cohesive film may not be required or even desired in an electrographic imaging process if the image is not subsequently transferred to a final receptor, or if the transfer is effected by means (e.g. electrostatic transfer) not requiring a film formed toner on a temporary image receptor (e.g. a photoreceptor). Similarly, in multi-color (or multi-pass) electrostatic printing wherein a stylus is used to generate a latent electrostatic image directly upon a dielectric receptor that serves as the final toner receptor material, a rapidly self-fixing toner film may be undesirably removed in passing under the stylus. This head scraping can be reduced or eliminated by manipulating the effective glass transition temperature of the organosol. For liquid electrographic (electrostatic) toners, particularly liquid toners developed for use in direct electrostatic printing processes, the D portion of the organosol is preferably provided with a sufficiently high $T_g$ such that the organosol exhibits an effective glass transition temperature of from about 15° C. to about 55° C., and the D portion exhibits a $T_g$ calculated using the Fox equation, of about 30–55° C. Liquid toners having both a polymerizable crystalline compound in the organosol and having an effective glass transition temperature of about 15–55° C. provide particular benefit in the multipass electrostatic printing process as described above, because the toner exhibits both excellent fusing temperature and superior resistance to marring or scraping either during or after the image is printed.

A wide variety of one or more different monomeric, oligomeric and/or polymeric materials may be independently incorporated into the S and D portions, as desired. Representative examples of suitable materials include free radically polymerized material (also referred to as vinyl copolymers or (meth) acrylic copolymers in some embodiments), polyurethanes, polyester, epoxy, polyamide, polyimide, polysiloxane, fluoropolymer, polysulfone, combinations of these, and the like. Preferred S and D portions are derived from free radically polymerizable material. In the practice of the present invention, "free radically polymerizable" refers to monomers, oligomers, and/or polymers having functionality directly or indirectly pendant from a monomer, oligomer, or polymer backbone (as the case may be) that participate in polymerization reactions via a free radical mechanism. Representative examples of such functionality includes (meth)acrylate groups, olefinic carbon-carbon double bonds, allyloxy groups, alpha-methyl styrene groups, (meth)acrylamide groups, cyanate ester groups, vinyl ether groups, combinations of these, and the like. The term "(meth)acryl", as used herein, encompasses acryl and/or methacryl.

Free radically polymerizable monomers, oligomers, and/or polymers are advantageously used to form the copolymer in that so many different types are commercially available and may be selected with a wide variety of desired characteristics that help provide one or more desired performance characteristics. Free radically polymerizable monomers, oligomers, and/or monomers suitable in the practice of the present invention may include one or more free radically polymerizable moieties.

Representative examples of monofunctional, free radically polymerizable monomers include styrene, alpha-methylstyrene, substituted styrene, vinyl esters, vinyl ethers, N-vinyl-2-pyrrolidone, (meth)acrylamide, vinyl naphthalene, alkylated vinyl naphthalenes, alkoxy vinyl naphthalenes, N-substituted (meth)acrylamide, octyl (meth)acrylate, nonylphenol ethoxylate (meth)acrylate, N-vinyl pyrrolidone, isononyl (meth)acrylate, isobornyl (meth)acrylate, 2-(2-ethoxyethoxy)ethyl (meth)acrylate, 2-ethylhexyl (meth)acrylate, beta-carboxyethyl (meth)acrylate, isobutyl (meth)acrylate, cycloaliphatic epoxide, alpha-epoxide, 2-hydroxyethyl (meth)acrylate, (meth)acrylonitrile, maleic anhydride, itaconic acid, isodecyl (meth)acrylate, lauryl (dodecyl) (meth)acrylate, stearyl (octadecyl) (meth)acrylate, behenyl (meth)acrylate, n-butyl (meth)acrylate, methyl (meth)acrylate, ethyl (meth)acrylate, hexyl (meth)acrylate, (meth)acrylic acid, N-vinylcaprolactam, stearyl (meth)acrylate, hydroxy functional caprolactone ester (meth)acrylate, isooctyl (meth)acrylate, hydroxyethyl (meth)acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, isobornyl (meth)acrylate, glycidyl (meth) acrylate vinyl acetate, combinations of these, and the like.

Preferred copolymers of the present invention may be formulated with one or more radiation curable monomers or combinations thereof that help the free radically polymerizable compositions and/or resultant cured compositions to satisfy one or more desirable performance criteria. For example, in order to promote hardness and abrasion resistance, a formulator may incorporate one or more free radically polymerizable monomer(s) (hereinafter "high $T_g$ component") whose presence causes the polymerized material, or a portion thereof, to have a higher glass transition temperature, $T_g$, as compared to an otherwise identical material lacking such high $T_g$ component. Preferred monomeric constituents of the high $T_g$ component generally include monomers whose homopolymers have a $T_g$ of at least about 50° C., preferably at least about 60° C., and more preferably at least about 75° C. in the cured state.

An exemplary class of radiation curable monomers that tend to have relatively high $T_g$ characteristics suitable for incorporation into the high $T_g$ component generally comprise at least one radiation curable (meth)acrylate moiety and at least one nonaromatic, alicyclic and/or nonaromatic heterocyclic moiety. Isobornyl (meth)acrylate is a specific example of one such monomer. A cured, homopolymer film formed from isobornyl acrylate, for instance, has a $T_g$ of 110° C. The monomer itself has a molecular weight of 222 g/mole, exists as a clear liquid at room temperature, has a viscosity of 9 centipoise at 25° C., and has a surface tension of 31.7 dynes/cm at 25° C. Additionally, 1,6-Hexanediol di(meth)acrylate is another example of a monomer with high $T_g$ characteristics.

Trimethyl cyclohexyl methacrylate (TCHMA) is another example of a high $T_g$ monomer useful in the practice of the present invention. TCHMA has a $T_g$ of 125° C. and tends to be soluble in oleophilic solvents. Consequently, TCHMA is easily incorporated into S material. However, if used in limited amounts so as not to unduly impair the insolubility characteristics of D material, some TCHMA may also be incorporated into D the material.

In a particularly preferred embodiment of the present invention, the S portion of the copolymer has a glass transition temperature calculated using the Fox equation (excluding grafting site components) of at least about 90° C., and more preferably has a glass transition temperature calculated using the Fox equation (excluding grafting site components) of from about 100° C. to about 130° C. Preferably, at least about 75%, and more preferably at least about 90%, of the S portion (excluding grafting site components) is derived from ingredients selected from the group consisting of trimethyl cyclohexyl methacrylate; t-butyl methacrylate; n-butyl methacrylate; isobornyl (meth)acrylate; 1,6-Hexanediol di(meth)acrylate and combinations thereof. Toners using copolymers having the above described S portion characteristics exhibit particularly superior performance properties in image quality and transfer as described herein.

Nitrile functionality may be advantageously incorporated into the copolymer for a variety of reasons, including improved durability, enhanced compatibility with optional visual enhancement additive(s), e.g., colorant particles, and the like. In order to provide a copolymer having pendant nitrile groups, one or more nitrile functional monomers can be used. Representative examples of such monomers include (meth)acrylonitrile, β-cyanoethyl-(meth)acrylate, 2-cyanoethoxyethyl (meth)acrylate, p-cyanostyrene, p-(cyanomethyl)styrene, N-vinylpyrrolidinone, and the like.

In order to provide a copolymer having pendant hydroxyl groups, one or more hydroxyl functional monomers can be used. Pendant hydroxyl groups of the copolymer not only facilitate dispersion and interaction with the pigments in the formulation, but also promote solubility, cure, reactivity with other reactants, and compatibility with other reactants. The hydroxyl groups can be primary, secondary, or tertiary, although primary and secondary hydroxyl groups are preferred. When used, hydroxy functional monomers constitute from about 0.5 to 30, more preferably 1 to about 25 weight percent of the monomers used to formulate the copolymer, subject to preferred weight ranges for graft copolymers noted below.

Representative examples of suitable hydroxyl functional monomers include an ester of an α,β-unsaturated carboxylic acid with a diol, e.g., 2-hydroxyethyl (meth)acrylate, or 2-hydroxypropyl (meth)acrylate; 1,3-dihydroxypropyl-2-(meth)acrylate; 2,3-dihydroxypropyl-1-(meth)acrylate; an adduct of an α,β-unsaturated carboxylic acid with caprolactone; an alkanol vinyl ether such as 2-hydroxyethyl vinyl ether; 4-vinylbenzyl alcohol; allyl alcohol; p-methylol styrene; or the like.

Polymerizable crystallizable compound(s) (PCC's), e.g. crystalline monomer(s), also may be advantageously incorporated into the copolymer in order to improve blocking resistance between printed receptors and to reduce offset during fusing. Polymerizable crystallizable compounds are incorporated into the copolymer by chemical incorporation, e.g., polymerization or copolymerization. The term "crystalline monomer" refers to a monomer whose homopolymeric analog is capable of independently and reversibly crystallizing at or above room temperature (e.g., 22° C.).

In these embodiments, the resulting toner particles can exhibit improved blocking resistance between printed receptors and reduced offset during fusing. If used, one or more of these crystalline monomers may be incorporated into the S and/or D material, but preferably is incorporated into the D material. Suitable crystalline monomers include alkyl (meth)acrylates where the alkyl chain contains more than 13 carbon atoms (e.g. tetradecyl(meth)acrylate, pentadecyl (meth)acrylate, hexadecyl(meth)acrylate, heptadecyl(meth) acrylate, octadecyl(meth)acrylate, etc). Other suitable crystalline monomers whose homopolymers have melting points above 22° C. include aryl acrylates and methacrylates; high molecular weight alpha olefins; linear or branched long chain alkyl vinyl ethers or vinyl esters; long chain alkyl isocyanates; unsaturated long chain polyesters, polysiloxanes and polysilanes; polymerizable natural waxes with melting points above 22° C.; polymerizable synthetic waxes with melting points above 22° C.; and other similar type materials known to those skilled in the art. As described herein, incorporation of crystalline monomers in the copolymer provides surprising benefits to the resulting dry toner particles.

It will be understood by those skilled in the art that blocking resistance can be observed at temperatures above room temperature but below the crystallization temperature of the polymer or copolymer portion incorporating the crystalline monomers or other polymerizable crystallizable compound. Improved blocking resistance is observed when the crystalline monomer is a major component of the S material, preferably greater than or equal to 45%, more preferably greater than or equal to 75%, most preferably greater than or equal to 90% of the S material incorporated into the copolymer.

Many crystalline monomers tend to be soluble in oleophilic solvents commonly used as liquid carrier material(s) in an organosol. Thus, crystalline monomer is relatively easily incorporated into S material without impacting desired solubility characteristics. However, if too much of such crystalline monomer were to be incorporated into D material, the resultant D material may tend to be too soluble in the organosol. Yet, so long as the amount of soluble, crystalline monomer in the D material is limited, some amount of crystalline monomer may be advantageously incorporated into the D material without unduly impacting the desired insolubility characteristics. Thus, when present in the D material, the crystalline monomer is preferably provided in an amount of up to about 30%, more preferably up to about 20%, most preferably up to about 5% to 10% of the total D material incorporated into the copolymer.

When crystalline monomers or PCC's are chemically incorporated into the S material, suitable co-polymerizable compounds that can be used in combination with the PCC include monomers such as other PCC's, 2-ethylhexyl acrylate, 2-ethylhexyl (methacrylate), lauryl acrylate, lauryl methacrylate, octadecyl acrylate, octadecyl(methacrylate), isobornyl acrylate, isobornyl (methacrylate), hydroxy(ethylmethacrylate), other acrylates and methacrylates, combinations of these and the like.

It is also advantageous to incorporate monomers into the copolymer that provide polymerized portions that are inherently triboelectrically charged. When used, it is preferred to incorporate such materials into the S material, as this material tends to be more solvated by the liquid carrier and is therefore located towards the outside surface or shell of the resultant triboelectrically charged toner particles. Monomers that provide polymer portions with positive and/or negative triboelectric charges may be used in amounts effective to produce the desired inherent triboelectric charge characteristics. For instance, butyl methacrylate generally tends to provide a more positive (less negative) triboelectric charge while styrene tends to provide a more negative (less positive) triboelectric charge, particularly when used in combination with other monomers.

Multifunctional free radically reactive materials may also used to enhance one or more properties of the resultant toner particles, including crosslink density, hardness, tackiness, mar resistance, or the like. Examples of such higher functional, monomers include ethylene glycol di(meth)acrylate, hexanediol di(meth)acrylate, triethylene glycol di(meth)acrylate, tetraethylene glycol di(meth)acrylate, trimethylolpropane tri(meth)acrylate, ethoxylated trimethylolpropane tri(meth)acrylate, glycerol tri(meth)acrylate, pentaerythritol tri(meth)acrylate, pentaerythritol tetra(meth)acrylate, and neopentyl glycol di(meth)acrylate, divinyl benzene, combinations of these, and the like.

Suitable free radically reactive oligomer and/or polymeric materials for use in the present invention include, but are not limited to, (meth)acrylated urethanes (i.e., urethane (meth)acrylates), (meth)acrylated epoxies (i.e., epoxy (meth)acrylates), (meth)acrylated polyesters (i.e., polyester (meth)acrylates), (meth)acrylated (meth)acrylics, (meth)acrylated silicones, (meth)acrylated polyethers (i.e., polyether (meth)acrylates), vinyl (meth)acrylates, and (meth)acrylated oils.

Reactive colorants to be incorporated in the amphipathic copolymers of the present invention may be any chromophore compound having functional groups that will react with functional groups on components forming the amphipathic copolymer to form a urethane, urea or amide linkage. For example, when the functional group on components forming the amphipathic copolymer is an isocyanate functionality, the chromophore compound has functional groups selected from hydroxyl, amino and carboxyl functionality. Similarly, when the functional group on components forming the amphipathic copolymer is selected from hydroxyl, amino and carboxyl functionality, the chromophore compound has an isocyanate functionality. Examples of such chromophore compounds are known in the art, and include those disclosed in U.S. Pat. No. 4,614,521 to Niwa, et. al.; U.S. Pat. No. 4,775,748 to Kluger et al.; U.S. Pat. No. 4,985,546 to Miley, et al.; U.S. Pat. No. 5,082,938 to Kluger et al.; U.S. Pat. No. 5,290,921 to Moody, et al.; U.S. Pat. No. 5,919,846 to Batlaw, et al.; and U.S. Pat. No. 6,077,927 to Stephens, et al.

Copolymers of the present invention can be prepared by free-radical polymerization methods known in the art, including but not limited to bulk, solution, and dispersion polymerization methods. The resultant copolymers may have a variety of structures including linear, branched, three dimensionally networked, graft-structured, combinations thereof, and the like. A preferred embodiment is a graft copolymer comprising one or more oligomeric and/or polymeric arms attached to an oligomeric or polymeric backbone. In graft copolymer embodiments, the S portion or D portion materials, as the case may be, may be incorporated into the arms and/or the backbone.

Any number of reactions known to those skilled in the art may be used to prepare a free radically polymerized copolymer having a graft structure. Common grafting methods include random grafting of polyfunctional free radicals; copolymerization of monomers with macromonomers; ring-opening polymerizations of cyclic ethers, esters, amides or acetals; epoxidations; reactions of hydroxyl or amino chain transfer agents with terminally-unsaturated end groups; esterification reactions (i.e., glycidyl methacrylate undergoes tertiary-amine catalyzed esterification with methacrylic acid); and condensation polymerization.

Representative methods of forming graft copolymers are described in U.S. Pat. Nos. 6,255,363; 6,136,490; and 5,384,226; and Japanese Published Patent Document No. 05-119529, incorporated herein by reference. Representative examples of grafting methods are also described in sections 3.7 and 3.8 of "Dispersion Polymerization in Organic Media," K. E. J. Barrett, ed., (John Wiley; New York, 1975) pp. 79–106, also incorporated herein by reference.

Representative examples of grafting methods also may use an anchoring group to facilitate anchoring. The function of the anchoring group is to provide a covalently bonded link between the core part of the copolymer (the D material) and the soluble shell component (the S material). Suitable monomers containing anchoring groups include: adducts of alkenylazlactone comonomers with an unsaturated nucleophile containing hydroxy, amino, or mercaptan groups, such as 2-hydroxyethylmethacrylate, 3-hydroxypropylmethacrylate, 2-hydroxyethylacrylate, pentaerythritol triacrylate, 4-hydroxybutylvinylether, 9-octadecen-1-ol, cinnamyl alcohol, allyl mercaptan, methallylamine; and azlactones, such as 2-alkenyl-4,4-dialkylazlactone.

In one aspect of the present invention a method of making an amphipathic copolymer comprising at least one covalently bonded chromophore is provided. In this method, a plurality of free radically polymerizable monomers is provided wherein at least one of the monomers comprises a first reactive functionality. These monomers are free radically polymerized in a solvent to form a first reactive functional polymer, wherein the monomers and the first reactive functional polymer are soluble in the solvent. A compound having a second reactive functionality that is reactive with the first reactive functionality and also contains free radically polymerizable functionality is reacted with the first reactive functional polymer under conditions such that at least a portion of the second reactive functionality of the compound reacts with at least a portion of the first reactive functionality of the polymer to form one or more linkages by which the compound is linked to the polymer. The resulting polymer is an S material portion polymer with pendant free radically polymerizable functionality.

A composition comprising (i) the S material portion polymer with pendant free radically polymerizable functionality described above, (ii) one or more free radically polymerizable monomers, (iii) a chromophore comprising a third reactive functionality, and (iv) liquid carrier in which polymeric material derived from ingredients comprising the one or more additional monomers of ingredient (ii) is insoluble is then polymerized. At least one of the ingredients (i) and (ii) above comprises a fourth reactive functionality that is available for reaction. In the above compositions, one of the third and fourth reactive functionalities is an isocyanate functionality, and the other of the third and fourth reactive functionalities is selected from the group consisting of hydroxyl, amino, carboxyl or mixtures thereof. The copolymerizing occurs under conditions effective to form an amphipathic copolymer having S and D portions and a chromophore covalently bonded thereto via a urethane, urea or amide linkage. Preferably, one of the first and second reactive functionality is selected from hydroxyl, amino, and carboxyl functionalities, and mixtures thereof, and the other of the first and second reactive functionalities is selected from isocyanate and epoxy functionalities. The chromophore may be covalently bonded to the S portion of the amphipathic copolymer, the D portion of the amphipathic copolymer, or both the S and D portions.

The preferred methodology described below accomplishes grafting via attaching an ethylenically-unsaturated isocyanate (e.g. dimethyl-m-isopropenyl benzylisocyanate, TMI, available from CYTEC Industries, West Paterson, N.J.; or isocyanatoethyl methacrylate, also known as IEM) to hydroxyl groups in order to provide free radically reactive anchoring groups.

A preferred method of forming a graft copolymer of the present invention involves three reaction steps that are carried out in a suitable substantially nonaqueous liquid carrier in which resultant S material is soluble while D material is dispersed or insoluble. In a first preferred step, a hydroxyl functional, free radically polymerized oligomer or polymer is formed from one or more monomers, wherein at least one of the monomers has pendant hydroxyl functionality. Preferably, the hydroxyl functional monomer constitutes about 1 to about 30, preferably about 2 to about 10 percent, most preferably 3 to about 5 percent by weight of the monomers used to form the oligomer or polymer of this first step. This first step is preferably carried out via solution polymerization in a substantially nonaqueous solvent in which the monomers and the resultant polymer are soluble. For instance, using the Hildebrand solubility data in Table 1, monomers such as octadecyl methacrylate, octadecyl acrylate, lauryl acrylate, and lauryl methacrylate are suitable for this first reaction step when using an oleophilic solvent such as heptane or the like.

In a second reaction step, all or a portion of the hydroxyl groups of the soluble polymer are catalytically reacted with an ethylenically unsaturated aliphatic isocyanate (e.g. meta-isopropenyldimethylbenzyl isocyanate commonly known as TMI or isocyanatoethyl methacrylate, commonly known as IEM) to form; pendant free radically polymerizable functionality which is attached to the oligomer or polymer via a polyurethane linkage. This reaction can be carried out in the same solvent, and hence the same reaction vessel, as the first step. The resultant double-bond functionalized polymer generally remains soluble in the reaction solvent and constitutes the S portion material of the resultant copolymer, which ultimately will constitute at least a portion of the solvatable portion of the resultant triboelectrically charged particles. When the chromophore is to be located at the S portion of the amphipathic copolymer, preferably there are available NCO groups during or after this polymerization process for reaction with hydroxyl functionality on a chromophore compound.

The resultant free radically reactive functionality provides grafting sites for attaching D material and optionally additional S material to the polymer. In a third step, these grafting site(s) are used to covalently graft such material to the polymer via reaction with one or more free radically reactive monomers, oligomers, and or polymers that are initially soluble in the solvent, but then become insoluble as the molecular weight of the graft copolymer increases. For instance, using the Hildebrand solubility parameters in Table 1, monomers such as e.g. methyl (meth)acrylate, ethyl (meth)acrylate, t-butyl methacrylate and styrene are suitable for this third reaction step when using an oleophilic solvent such as heptane or the like. When the chromophore is to be located at the D portion of the amphipathic copolymer, preferably there are available NCO groups during or after this polymerization process for reaction with hydroxyl functionality on a chromophore compound.

The product of the third reaction step is generally an organosol comprising the resultant copolymer dispersed in the reaction solvent, which constitutes a substantially nonaqueous liquid carrier for the organosol. At this stage, it is believed that the copolymer tends to exist in the liquid carrier as discrete, monodisperse particles having dispersed (e.g., substantially insoluble, phase separated) portion(s) and solvated (e.g., substantially soluble) portion(s). As such, the solvated portion(s) help to sterically-stabilize the dispersion of the particles in the liquid carrier. It can be appreciated that the copolymer is thus advantageously formed in the liquid carrier in situ.

Before further processing, the copolymer particles may remain in the reaction solvent. Alternatively, the particles may be transferred in any suitable way into fresh solvent that is the same or different so long as the copolymer has solvated and dispersed phases in the fresh solvent. In either case, the resulting chromophore-containing organosol may optionally additionally incorporate visible enhancement additives by preferably mixing the organosol with at least one visual enhancement additive. Optionally, one or more other desired ingredients also can be mixed into the organosol before and/or after combination with the visual enhancement particles. During such combination, it is believed that ingredients comprising the visual enhancement additive and the copolymer will tend to self-assemble into composite particles having a structure wherein the dispersible phase portions generally tend to associate with the visual enhancement additive particles (for example, by physically and/or chemically interacting with the surface of the particles), while the solvatable phase portions help promote dispersion in the carrier. The dispersion is then dried to the desired degree to provide composite particles that have dry toner functionality.

The manner in which the dispersion is dried, when preparing dry toner compositions, may impact the degree to which the resultant toner particles may be agglomerated and/or aggregated. In preferred modes of practice, the particles are dried while fluidized, aspirated, suspended, or entrained (collectively "fluidized") in a carrier gas to minimize aggregation and/or agglomeration of the dry toner particles as the particles dry. In practical effect, the fluidized particles are dried while in a low density condition. This minimizes interparticle collisions, allowing particles to dry in relative isolation from other particles. Such fluidizing may be achieved using vibration energy, electrostatic energy, a moving gas, combinations of these, and the like. The carrier gas may comprise one or more gases that may be generally inert (e.g. nitrogen, air, carbon dioxide, argon, or the like). Alternatively, the carrier gas may include one or more reactive species. For instance, an oxidizing and/or reducing species may be used if desired. Advantageously, the product of fluidized drying constitutes free flowing dry toner particles with a narrow particle size distribution.

As one example of using a fluidized bed dryer, the liquid toners may be filtered or centrifuged to form a wet cake. The wet filter cake may be placed into the conical drying chamber of a fluid bed dryer (such as that available from Niro Aeromatic, Niro Corp., Hudson, Wis.). Ambient air at about 35–50° C., or preferably lower than the $T_g$ of the copolymer, may be passed through the chamber (from bottom to top) with a flow rate sufficient to loft any dried powder and to keep the powder airborne inside the vessel (i.e., a fluidized powder bed). The air may be heated or otherwise pretreated. Bag filters in the vessel allow the air to leave the drying vessel while keeping the powder contained. Any toner that accumulates on the filter bags may be blown down by a periodic reverse air flow through the filters. Samples may be dried anywhere from 10–20 minutes to several hours, depending on the nature of the solvent (e.g. boiling point), the initial solvent content, and the drying conditions.

Advantageously, the S material of the copolymer serves as a graft stabilizer, chemically bonded steric stabilizer, or internal dispersant for the toner particles in the fluidized state. Consequently, although separate dispersant material could be used to help mix the dry toner ingredients together, the use of a separate dispersant material is not needed, or even desirable, in preferred embodiments. Separate dispersants are less desirable as these tend to be humidity sensitive, and may migrate from the toner particles during printing. Dry toner particles incorporating separate dispersant material may tend to have charging characteristics that vary with humidity changes. By avoiding separate dispersant material, it is believed that preferred embodiments of the present invention would show more stable charging characteristics with changes in humidity.

The optional visual enhancement additive(s) generally may include any one or more fluid and/or particulate materials that provide a desired visual effect when toner particles incorporating such materials are printed onto a receptor. Examples include one or more colorants, fluorescent materials, pearlescent materials, iridescent materials, metallic materials, flip-flop pigments, silica, polymeric beads, reflective and non-reflective glass beads, mica, combinations of these, and the like. The amount of visual enhancement additive incorporated into the toner particles may vary over a wide range. In representative embodiments, a suitable weight ratio of copolymer to visual enhancement additive is from 1/1 to 20/1, preferably from 2/1 to 10/1 and most preferably from 4/1 to 8/1.

Useful colorants to be used as optional additional visual enhancement additives are well known in the art and include materials listed in the Colour Index, as published by the Society of Dyers and Colourists (Bradford, England), including dyes, stains, and pigments. Preferred colorants are pigments which may be combined with ingredients comprising the copolymer to interact with the D portion of the copolymer to form dry toner particles with structure as described herein, are at least nominally insoluble in and nonreactive with the carrier liquid, and are useful and effective in making visible the latent electrostatic image. It is understood that the optional visual enhancement additive(s) may also interact with each other physically and/or chemically, forming aggregations and/or agglomerates of visual enhancement additives that also interact with the D portion of the copolymer. Examples of suitable colorants include: phthalocyanine blue (C.I. Pigment Blue 15:1, 15:2, 15:3 and 15:4), monoarylide yellow (C.I. Pigment Yellow 1, 3, 65, 73 and 74), diarylide yellow (C.I. Pigment Yellow 12, 13, 14, 17 and 83), arylamide (Hansa) yellow (C.I. Pigment Yellow 10, 97, 105 and 111), isoindoline yellow (C.I. Pigment Yellow 138), azo red (C.I. Pigment Red 3, 17, 22, 23, 38, 48:1, 48:2, 52:1, and 52:179), quinacridone magenta (C.I. Pigment Red 122, 202 and 209), laked rhodamine magenta (C.I. Pigment Red 81:1, 81:2, 81:3, and 81:4), and black pigments such as finely divided carbon (Cabot Monarch 120, Cabot Regal 300R, Cabot Regal 350R, Vulcan X72, and Aztech ED 8200), and the like.

In addition to the visual enhancement additive, other additives optionally may be formulated into the triboelectrically charged particle formulation. A particularly preferred additive comprises at least one charge control additive (charge control agent, CCA). The charge control additive, also known as a charge director, helps to provide uniform charge polarity of the toner particles. The charge director may be incorporated into the toner particles using a variety of methods such as, copolymerizing a suitable monomer with the other monomers used to form the copolymer, chemically reacting the charge director with the toner particle, chemically or physically adsorbing the charge director onto the toner particle (resin or pigment), or chelating the charge director to a functional group incorporated into the toner particle. A preferred method is via a functional group built into the S material of the copolymer.

It is preferable to use a triboelectric charge control additive that may be included as a separate ingredient and/or included as one or more functional moiety(ies) of S and/or D material incorporated into the amphipathic copolymer. The triboelectric charge control additive is used to enhance the chargeability of the toner. The triboelectric charge control agent may have either a negative or a positive electric charge. As representative examples of the triboelectric charge control additive, there can be mentioned nigrosine NO1 (produced by Orient Chemical Co.), nigrosine EX (produced by Orient Chemical Co.), Aizen Spilon black TRH (produced by Hodogaya Chemical Co.), T-77 (produced by Hodogaya Chemical Co.), Bontron S-34 (produced by Orient Chemical Co.), and Bontron E-84 (produced by Orient Chemical Co.). The amount of the triboelectric charge control additive, based on 100 parts by weight of the toner solids, is generally 0.01 to 10 parts by weight, preferably 0.1 to 5 parts by weight.

Other additives may also be added to the formulation in accordance with conventional practices. These include one or more of UV stabilizers, mold inhibitors, bactericides, fungicides, antistatic agents, gloss modifying agents, other polymer or oligomer material, antioxidants, anticaking agents such as silane or silicone-modified silica particles (typically 5 to 50 nm particle size), combinations of these, and the like.

The particle size of the resultant triboelectrically charged toner particles may impact the imaging, fusing, resolution, and transfer characteristics of the toner incorporating such particles. Preferably, the volume mean particle diameter (determined by laser diffraction light scattering) of the toner particles is in the range of about 0.5 to about 30.0 microns, more preferably in the range of about 1 to about 15 microns, most preferably in the range of about 3 to about 10 microns.

In electrophotographic and electrographic processes, an electrostatic image is formed on the surface of a photoreceptive element or dielectric element, respectively. The photoreceptive element or dielectric element may be an intermediate transfer drum or belt or the substrate for the final toned image itself, as described by Schmidt, S. P. and Larson, J. R. in Handbook of Imaging Materials Diamond, A. S., Ed: Marcel Dekker: New York; Chapter 6, pp 227–252, and U.S. Pat. Nos. 4,728,983; 4,321,404; and 4,268,598.

In electrography, a latent image is typically formed by (1) placing a charge image onto the dielectric element (typically the receiving substrate) in selected areas of the element with an electrostatic writing stylus or its equivalent to form a charge image, (2) applying toner to the charge image, and (3) fixing the toned image. An example of this type of process is described in U.S. Pat. No. 5,262,259. Images formed by the present invention may be of a single color or a plurality of colors. Multicolor images can be prepared by repetition of the charging and toner application steps.

In electrophotography, the electrostatic image is typically formed on a drum or belt coated with a photoreceptive element by (1) uniformly charging the photoreceptive element with an applied voltage, (2) exposing and discharging portions of the photoreceptive element with a radiation source to form a latent image, (3) applying a toner to the latent image to form a toned image, and (4) transferring the toned image through one or more steps to a final receptor sheet. In some applications, it is sometimes desirable to fix the toned image using a heated pressure roller or other fixing methods known in the art.

While the electrostatic charge of either the toner particles or photoreceptive element may be either positive or negative, electrophotography as employed in the present invention is preferably carried out by dissipating charge on a positively charged photoreceptive element. A positively-charged toner is then applied to the regions in which the positive charge was dissipated using a dry toner development technique.

The substrate for receiving the image from the photoreceptive element can be any commonly used receptor material, such as paper, coated paper, polymeric films and primed or coated polymeric films. Polymeric films include polyesters and coated polyesters, polyolefins such as polyethylene or polypropylene, plasticized and compounded polyvinyl chloride (PVC), acrylics, polyurethanes, polyethylene/acrylic acid copolymer, and polyvinyl butyrals. The polymer film may be coated or primed, e.g. to promote toner adhesion.

These and other aspects of the present invention are demonstrated in the illustrative examples that follow.

EXAMPLES

Test Methods and Apparatus

In the following examples, percent solids of the copolymer solutions and the organosol and ink dispersions were determined gravimetrically using the Halogen Lamp Drying Method using a halogen lamp drying oven attachment to a precision analytical balance (Mettler Instruments, Inc., Highstown, N.J.). Approximately two grams of sample were used in each determination of percent solids using this sample dry down method.

In the practice of the invention, molecular weight is normally expressed in terms of the weight average molecular weight, while molecular weight polydispersity is given by the ratio of the weight average molecular weight to the number average molecular weight. Molecular weight parameters were determined with gel permeation chromatography (GPC) using tetrahydrofuran as the carrier solvent. Absolute weight average molecular weight were determined using a Dawn DSP-F light scattering detector (Wyatt Technology Corp., Santa Barbara, Calif.), while polydispersity was evaluated by ratioing the measured weight average molecular weight to a value of number average molecular weight determined-with an Optilab 903 differential refractometer detector (Wyatt Technology Corp., Santa Barbara, Calif.).

Organosol and toner particle size distributions were determined by a Laser Diffraction Method using a Horiba LA-900 laser diffraction particle size analyzer (Horiba Instruments, Inc., Irvine, Calif.). Samples were diluted approximately 1/500 by volume and sonicated for one minute at 150 watts and 20 kHz prior to measurement. Particle size was expressed as both a number mean diameter ($D_n$) and a volume mean diameter ($D_v$) and in order to provide an indication of both the fundamental (primary) particle size and the presence of aggregates or agglomerates.

The liquid toner conductivity (bulk conductivity, $k_b$) was determined at approximately 18 Hz using a Scientifica Model 627 conductivity meter (Scientifica Instruments, Inc., Princeton, N.J.). In addition, the free (liquid dispersant) phase conductivity ($k_f$) in the absence of toner particles was also determined. Toner particles were removed from the liquid medium by centrifugation at 5° C. for 1–2 hours at 6,000 rpm (6,110 relative centrifugal force) in a Jouan MR1822 centrifuge (Winchester, Va.). The supernatant liquid was then carefully decanted, and the conductivity of this liquid was measured using a Scientifica Model 627 conductance meter. The percentage of free phase conductivity relative to the bulk toner conductivity was then determined as 100% ($k_f/k_b$).

Toner particle electrophoretic mobility (dynamic mobility) was measured using a Matec MBS-8000 Electrokinetic Sonic Amplitude Analyzer (Matec Applied Sciences, Inc., Hopkinton, Mass.). Unlike electrokinetic measurements based upon microelectro-phoresis, the MBS-8000 instrument has the advantage of requiring no dilution of the toner sample in order to obtain the mobility value. Thus, it is possible to measure toner particle dynamic mobility at solids concentrations actually preferred in printing. The MBS-8000 measures the response of charged particles to high frequency (1.2 MHz) alternating (AC) electric fields. In a high frequency AC electric field, the relative motion between charged toner particles and the surrounding dispersion medium (including counter-ions) generates an ultrasonic wave at the same frequency of the applied electric field. The amplitude of this ultrasonic wave at 1.2 MHz can be measured using a piezoelectric quartz transducer; this electrokinetic sonic amplitude (ESA) is directly proportional to the low field AC electrophoretic mobility of the particles. The particle zeta potential can then be computed by the instrument from the measured dynamic mobility and the known known toner particle size, liquid dispersant viscosity, and liquid dielectric constant.

The charge per mass measurement (Q/M) was measured using an apparatus that consists of a conductive metal plate, a glass plate coated with Indium Tin Oxide (ITO), a high voltage power supply, an electrometer, and a personal computer (PC) for data acquisition. A 1% solution of ink was placed between the conductive plate and the ITO coated glass plate. An electrical potential of known polarity and magnitude was applied between the ITO coated glass plate and the metal plate, generating a current flow between the plates and through wires connected to the high voltage power supply. The electrical current was measured 100 times a second for 20 seconds and recorded using the PC. The applied potential causes the charged toner particles to migrate towards the plate (electrode) having opposite polarity to that of the charged toner particles. By controlling the polarity of the voltage applied to the ITO coated glass plate, the toner particles may be made to migrate to that plate.

The ITO coated glass plate was removed from the apparatus and placed in an oven for approximately 30 minutes at 50° C. to dry the plated ink completely. After drying, the ITO coated glass plate containing the dried ink film was weighed. The ink was then removed from the ITO coated glass plate using a cloth wipe impregnated with Norpar™ 12, and the clean ITO glass plate was weighed again. The difference in mass between the dry ink coated glass plate and the clean glass plate is taken as the mass of ink particles (m) deposited during the 20 second plating time. The electrical current values were used to obtain the total charge carried by the toner particles (Q) over the 20 seconds of plating time by integrating the area under a plot of current vs. time using a curve-fitting program (e.g. TableCurve 2D from Systat Software Inc.). The charge per mass (Q/m) was then determined by dividing the total charge carried by the toner particles by the dry plated ink mass.

In the following examples, toner was printed onto final image receptors using the following methodology (referred to in the Examples as the Liquid Electrophotographic Printing Method):

A light sensitive temporary image receptor (organic photoreceptor or "OPC") was charged with a uniform positive charge of approximately 850 volts. The positively charged surface of the OPC was image-wise irradiated with a scanning infrared laser module in order to reduce the charge wherever the laser struck the surface. Typical charge-reduced values were between 50 volts and 100 volts.

A developer apparatus was then utilized to apply the toner particles to the OPC surface. The developer apparatus included the following elements: a conductive rubber developer roll in contact with the OPC, liquid toner, a conductive deposition roll, an insulative foam cleaning roll in contact with developer roll surface, and a conductive skiving blade (skive) in contact with the developer roll. The contact area between the developer roll and the OPC is referred to as the "developing nip." The developer roll and conductive deposition roll were both partially suspended in the liquid toner. The developer roll delivered liquid toner to the OPC surface, while the conductive deposition roll was positioned with its roll axis parallel to the developer roll axis and its surface arranged to be approximately 150 microns from the surface of the developer roll, thereby forming a deposition gap.

During development, toner was initially transferred to the developer roll surface by applying a voltage of approximately 500 volts to the conductive developer roll and applying a voltage of 600 volts to the deposition roll. This created a 100-volt potential between the developer roll and the deposition roll so that in the deposition gap, toner particles (which were positively charged) migrated to the surface of the developer roll and remained there as the developer roll surface exited from the liquid toner into the air.

The conductive metal skive was biased to at least 600 volts (or more) and skived liquid toner from the surface of the developer roll without scraping off the toner layer that was deposited in the deposition gap. The developer roll surface at this stage contained a uniformly thick layer of toner at approximately 25% solids. As this toner layer passed through the developing nip, toner was transferred from the developer roll surface to the OPC surface in all the discharged areas of the OPC (the charge image), since the toner particles were positively charged. At the exit of the developing nip, the OPC contained a toner image and the developer roll contained a negative of that toner image which was subsequently cleaned from the developer roll surface by encountering the rotating foam cleaning roll.

The developed latent image (toned image) on the photoreceptor was subsequently transferred to the final image receptor without film formation of the toner on the OPC. Transfer was effected either directly to the final image receptor, or indirectly using an electrostatically-assisted offset transfer to an Intermediate Transfer Belt (ITB), with subsequent electrostatically-assisted offset transfer to the final image receptor. Smooth, clay coated papers were preferred final image receptors for direct transfer of a non-film formed toner from the photoreceptor, while plain, uncoated 20 pound bond paper was a preferred final image receptor for offset transfer using an electrostatic assist. Electrostatically-assisted transfer of non film-formed toner was most effective when the transfer potential (potential difference between the toner on the OPC and the paper back-up roller for direct transfer; or potential difference between the toner on the OPC and the ITB for offset transfer) was maintained in the range of 200–1000 V or 800–2000 V, respectively.

Materials
LMA: lauryl methacrylate
HEMA: 2-hydroxyethyl methacrylate
TMI: dimethyl-m-isopropenyl benzyl isocyanate
EA: ethyl acrylate
EMA: ethyl methacrylate
V-601: initiator, dimethyl 2,2'-azobisisobutyrate
DBTDL: catalyst, dibutyl tin dilaurate

Example 1

PREPARATION OF GRAFT COPOLYMER STABILIZERS

Example 1

A 5000 ml 3-neck round flask equipped with a condenser, a thermocouple connected to a digital temperature controller, a nitrogen inlet tube connected to a source of dry nitrogen and a magnetic stirrer, was charged with a mixture of 2557 g of Norpar™ 12, 849 g of LMA, 26.8 g of 98% HEMA and 13.13 g of V-601. While stirring the mixture, the reaction flask was purged with dry nitrogen for 30 minutes at flow rate of approximately 2 liters/minute. A hollow glass stopper was then inserted into the open end of the condenser and the nitrogen flow rate was reduced to approximately 0.5 liters/minute. The mixture was heated to 70° C. for 16 hours. The conversion was quantitative.

The mixture was heated to 90° C. and held at that temperature for 1 hour to destroy any residual V-601, then was cooled back to 70° C. The nitrogen inlet tube was then removed, and 13.6 g of 95% DBTDL were added to the mixture, followed by 41.1 g of TMI. The TMI was added drop wise over the course of approximately 5 minutes while stirring the reaction mixture. The nitrogen inlet tube was replaced, the hollow glass stopper in the condenser was removed, and the reaction flask was purged with dry nitrogen for 30 minutes at a flow rate of approximately 2 liters/minute. The hollow glass stopper was reinserted into the open end of the condenser and the nitrogen flow rate was reduced to approximately 0.5 liters/minute. The mixture was allowed to react at 70° C. for 6 hours, at which time the conversion was quantitative.

The mixture was then cooled to room temperature. The cooled mixture was viscous, transparent solution, containing no visible insoluble matter.

The percent solids of the liquid mixture was determined to be 25.98% using the Halogen Drying Method described above. Subsequent determination of molecular weight was made using the GPC method described above; the copolymer had a $M_w$ 191,550 of Da and $M_w/M_n$ of 2.5 based upon two independent measurements. The. product is a copolymer of LMA and HEMA containing random side chains of TMI and is designed herein as LMA/HEMA-TMI (97/3-4.7% w/w) and is suitable for making an organosol.

Examples 2–5

PREPARATION OF ORGANOSOLS BY INCORPORATING REACTINT™ URETHANE COLORANTS.

Example 2 (Comparative)

This is a comparative example using the graft stabilizer in Example 1 to prepare an organosol which containing no Reactint™ Urethane Colorants. A 8 ounce (0.24 liter), narrow-mouthed glass bottle was charged with 126 g of Norpar™ 12, 14.6 g of EMA, 1.4 g of EA, 7.7 g of the graft stabilizer mixture from Example 1 at 25.98% polymer solids, and 0.18 g of V-601. The bottle was purged for 1 minute with dry nitrogen at a rate of approximately 1.5 liters/minute, then sealed with a screw cap fitted with a Teflon liner. The cap was secured in place using electrical tape. The sealed bottle was then inserted into a metal cage assembly and installed on the agitator assembly of an Atlas Launder-Ometer (Atlas Electric Devices Company, Chicago, Ill.). The Launder-Ometer was operated at its fixed agitation speed of 42 RPM with a water bath temperature of 70° C. The mixture was allowed to react for approximately 16–18 hours, at which time the conversion of monomer to polymer was quantitative. The mixture was cooled to room temperature, yielding an opaque white dispersion.

This organosol was designated LMA/HEMA-TMI//EA/ EMA (97/3-4.7//13/87% w/w). The percent solids of the organosol dispersion was determined to be 12.02% using the Halogen Lamp Drying Method described above. Subsequent determination of average particle size was made using the Laser Diffraction Analysis described above; the organosol had a volume average diameter of 1.2 µm.

Example 3

This is an example using the graft stabilizer in Example 1 to prepare an organosol with the Reactint™ Urethane Colorant chemically bonded to the organosol. A 5000 ml 3-neck round flask equipped with a condenser, a thermocouple connected to a digital temperature controller, a nitrogen inlet tube connected to a source of dry nitrogen and a magnetic stirrer, was charged with a mixture of 2880 g of Norpar™ 12, 341.5 g of EMA, 31.8 g of EA, 8.4 g of TMI, 52.5 g of Reactint™ Black X41LV (Milliken Chemical, Spartanburg, S.C. 29304) and 179.5 g of the graft stabilizer mixture from Example 1 at 25.98% polymer solids, and 6.30 g of V-601. While stirring the mixture, the reaction flask was purged with dry nitrogen for 30 minutes at flow rate of approximately 2 liters/minute. A hollow glass stopper was then inserted into the open end of the condenser and the nitrogen flow rate was reduced to approximately 0.5 liters/ minute. The mixture was heated to 70° C. for 16 hours. The conversion was quantitative. The mixture was cooled to room temperature, yielding a self stable black dispersion.

Approximately 350 g of n-heptane were added to the cooled dispersion, and the resulting mixture was stripped of residual monomer using a rotary evaporator equipped with a dry ice/acetone condenser and operating at a temperature of 90° C. and a vacuum of approximately 15 mm Hg. The stripped organosol was cooled to room temperature, yielding a stable black organosol.

This organosol was designated LMA/HEMA-TMI//EA/ EMA/TMI/Reactint Black (97/3-4.7//7.3/78.6/12.1/2.0% w/w). The percent solids of the organosol dispersion after stripping was determined to be 13.91% using the Halogen Lamp Drying Method described above. Subsequent determination of average particle size was made using the Laser Diffraction Analysis described above; the organosol had a volume average diameter of 2.1 µm.

Example 4

This is an example using the graft stabilizer in Example 2 to prepare an organosol with the Reactint™ Urethane Colorant chemically bonded to the organosol and the particle size smaller than 1.0 µm. Using the method and apparatus of Example 1, except a 32 ounce (0.96 liter) glass bottle was used, 536 g of Norpar™ 12, 63.4 g of EMA, 5.9 g of EA, 0.78 g of TMI, 9.8 g of Reactint™ Black X41LV (Milliken Chemical, Spartanburg, S.C. 29304) and 33.3 g of the graft stabilizer mixture from Example 1 at 25.98% polymer solids, and 1.17 g of V-601 were combined and resulting mixture reacted at 70° C. for 16 hours. The mixture was cooled to room temperature.

After stripping the dispersion using the method of Example 3 to remove residual monomer, the stripped dispersion was cooled to room temperature, yielding a self stable black organosol.

This organosol was designated LMA/HEMA-TMI//EA/ EMA/TMI/Reactint Black (97/3-4.7//7.4/79.3/12.3/1.0% w/w). The percent solids of the organosol dispersion after stripping was determined to be 13.69% using the Halogen Lamp Drying Method described above. Subsequent determination of average particle size was made using the Laser Diffraction Analysis described above; the organosol had a volume average diameter of 0.3 µm.

Example 5

This is an example using the graft stabilizer in Example 1 to prepare a black organosol with the Reactin™ Urethane Colorant chemically bonded to the organosol and the particle size larger than 5.0 µm. Using the method and apparatus of Example 2, except a 32 ounce (0.96 liter) glass bottle was used, 534 g of Norpar™ 12, 63.4 g of EMA, 5.9 g of EA, 2.34 g of TMI, 9.8 g of Reactint™ Black X41LV (Milliken Chemical, Spartanburg, S.C. 29304) and 33.3 g of the graft stabilizer mixture from Example 1 at 25.98% polymer solids, and 1.17 g of V-601 were combined and resulting mixture reacted at 70° C. for 16 hours. The mixture was cooled to room temperature.

After stripping the dispersion using the method of Example 2 to remove residual monomer, the stripped dispersion was cooled to room temperature, yielding a self stable black organosol.

This organosol was designated LMA/HEMA-TMI//EA/ EMA/TMI/Reactint Black (97/3-4.7//7/78/12/3% w/w). The percent solids of the organosol dispersion after stripping was determined to be 13.57% using the Halogen Lamp Drying Method described above. Subsequent determination of average particle size was made using the Laser Diffraction Analysis described above; the organosol had a volume average diameter of 8.0 µm.

Examples 6–7

PREPARATION OF LIQUID TONERS

For characterization of the prepared liquid toner compositions in these Examples, the following were measured: size-related properties (particle size); charge-related properties (bulk and free phase conductivity, dynamic mobility and zeta potential); and charge/developed reflectance optical density (Z/ROD), a parameter that is directly proportional to the toner charge/mass (Q/M).

Example 6

This is an example of preparing black liquid toner using the organosol prepared in example 3. 300 g of organosol in example 3 @ 13.91% (w/w) solids in Norpar™ 12 were combined with 2.32 g of 1.00% Zirconium HEX-CEM solution (OMG Chemical Company, Cleveland, Ohio) in a 0.5 liter plastic bottle. The mixture was placed on a shaker for 48 hour before testing.

A 13% (w/w) solids toner concentrate exhibited the following properties as determined using the test methods described above:
Volume Mean Particle Size: 2.0 micron
Q/M: 447 µC/g
Bulk Conductivity: 969 picoMhos/cm
Percent Free Phase Conductivity: 22.9%
Dynamic Mobility: 5.14E-11 (m$^2$/Vsec).

This toner was tested using the printing procedure described above. The reflection optical density (ROD) was 0.60 at plating voltages greater than 525 volts. The toner exhibited a good electrostatic transfer efficiency.

Example 7

This is an example of preparing black liquid toner using the organosol prepared in example 3. 300 g of organosol in example 3 @ 13.91% (w/w) solids in Norpar™ 12 were combined with 4.64 g of 1.00% Zirconium HEX-CEM solution (OMG Chemical Company, Cleveland, Ohio) in a 0.5 liter plastic bottle. The mixture was placed on a shaker for 48 hour before testing.

A 13% (w/w) solids toner concentrate exhibited the following properties as determined using the test methods described above:
Volume Mean Particle Size: 2.0 micron
Q/M: 840 µC/g
Bulk Conductivity: 1443 picoMhos/cm
Percent Free Phase Conductivity: 23.3%
Dynamic Mobility: 6.37E-11 (m$^2$/Vsec).

This toner was tested using the printing procedure described above. The reflection optical density (ROD) was 0.53 at plating voltages greater than 525 volts. The toner exhibited a good electrostatic transfer efficiency.

All percentages and ratios used herein are weight percentages and ratios unless otherwise indicated. All publications, patents and patent documents cited are fully incorporated by reference herein, as though individually incorporated by reference. Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

The invention claimed is:

1. An electrophotographic toner composition comprising at least one amphipathic copolymer, the amphipathic copolymer comprising one or more S portions and one or more D portions wherein the S material portions and the D material portions have respective solubilities in a liquid carrier having a Kauri-butanol number less than 30 ml in which the amphipathic copolymer is prepared that are sufficiently different from each other such that the S material portions tend to be more solvated by the carrier while the D material portions tend to be more dispersed in the liquid carrier, the amphipathic copolymer having a chromophore covalently bonded thereto via a urethane, urea or amide linkage.

2. The electrophotographic toner composition of claim 1, wherein the chromophore is covalently bonded to the amphipathic copolymer via a urethane linkage.

3. The electrophotographic toner composition of claim 1, wherein the chromophore is covalently bonded to the amphipathic copolymer via a urea linkage.

4. The electrophotographic toner composition of claim 1, wherein the chromophore is covalently bonded to the amphipathic copolymer via an amide linkage.

5. The electrophotographic toner composition of claim 1, wherein the chromophore is covalently bonded to the S portion of the amphipathic copolymer.

6. The electrophotographic toner composition of claim 1, wherein the chromophore is covalently bonded to the D portion of the amphipathic copolymer.

7. The electrophotographic toner composition of claim 1, wherein a single color of chromophore is covalently bonded to the amphipathic copolymer to provide a predetermined color.

8. The electrophotographic toner composition of claim 1, wherein a plurality of chromophores having different color are covalently bonded to the amphipathic copolymer to provide a predetermined blended color.

9. The electrophotographic toner composition of claim 1, said composition being substantially free of pigment.

10. An electrophotographic toner composition of claim 1, comprising a plurality of amphipathic copolymers having chromophores of different colors covalently bonded to separate amphipathic copolymers, which copolymers are blended in predetermined ratios to exhibit a predetermined blended toner composition color.

11. An electrophotographic toner composition of claim 1, the comprising amphipathic copolymers having a plurality of chromophores having different colors covalently bonded thereto in a predetermined ratio to provide a toner composition having a predetermined blended color.

12. A liquid electrophotographic toner composition of claim 1, comprising:
a) a liquid carrier having a Kauri-butanol number less than 30 mL; and
b) a plurality of toner particles dispersed in the liquid carrier, wherein the toner particles comprise polymeric binder comprising at least one amphipathic copolymer comprising one or more S portions and one or more D portions wherein the S material portions and the D material portions have respective solubilities in a liquid carrier having a Kauri-butanol number less than 30 ml in which the amphipathic copolymer is prepared that are sufficiently different from each other such that the S material portions tend to be more solvated by the carrier while the D material portions tend to be more dispersed in the liquid carrier, the amphipathic copolymer having a chromophore covalently bonded thereto via a urethane, urea or amide linkage.

13. A method of making an electrophotographic toner composition comprising the steps of:
A) preparing an amphipathic copolymer comprising at least one covalently bonded chromophore, comprising the steps of:
a) providing a plurality of free radically polymerizable monomers, wherein at least one of the monomers comprises a first reactive functionality;
b) free radically polymerizing the monomers in a solvent to form a first reactive functional polymer, wherein the monomers and the first reactive functional polymer are soluble in the solvent;
c) reacting a compound having a second reactive functionality that is reactive with the first reactive functionality and also having free radically polymerizable functionality with the first reactive functional polymer under conditions such that at least a portion of the second reactive functionality of the compound reacts with at least a portion of the first reactive functionality of the polymer to form one or more linkages by which the compound is linked to the polymer, thereby providing an S material portion polymer with pendant free radically polymerizable functionality;
d) copolymerizing ingredients comprising (i) the S material portion polymer with pendant free radically polymerizable functionality, (ii) one or more free radically polymerizable monomers, (iii) a chromophore comprising a third reactive functionality, and (iv) liquid carrier having a Kauri-butanol number less than 30 ml in which polymeric material derived from ingredients comprising the one or more additional monomers of ingredient (ii) is insoluble;
wherein at least one of the ingredients (i) mid (ii) comprises available fourth reactive functionality;
wherein one of the third and fourth reactive functionalities is an isocyanate functionality, and the other of the third and fourth reactive functionalities is selected from the group consisting of hydroxyl, amino, carboxyl or mixtures thereof; and wherein the copolymerizing occurs under conditions effective to form an amphipathic copolymer having S and D portions and a chromophore covalently bonded thereto via a urethane, urea or amide linkage;
wherein the S material portions and the D material portions have respective solubilities in a liquid carrier having a Kauri-butanol number less than 30 ml in which the amphipathic copolymer is prepared that are sufficiently different from each other such that the S material portions tend to be more solvated by the carrier while the D material portions tend to be more dispersed in the liquid carrier; and
B) formulating a toner composition comprising the amphipathic copolymer prepared in Step A) above.

14. The method of claim 13, wherein the chromophore is covalently bonded to the amphipathic copolymer via a urethane linkage.

15. The method of claim 13, wherein the chromophore is covalently bonded to the amphipathic copolymer via a urea linkage.

16. The method of claim 13, wherein the chromophore is covalently bonded to the amphipathic copolymer via an amide linkage.

17. The method of claim 13, wherein the third reactive functionality is isocyanate, and the fourth reactive functionality is selected from hydroxyl, amino, and carboxyl functionalities, and mixtures thereof.

18. The method of claim 13, wherein the third reactive functionality is isocyanate, and the fourth reactive functionality is hydroxyl.

19. The method of claim 13, wherein the third reactive functionality is selected from hydroxyl, amino, and carboxyl functionalities, and mixtures thereof and the fourth reactive functionality is isocyanate.

20. The method of claim 13, wherein the first reactive functionality is selected from hydroxyl, amino, and carboxyl functionalities, and mixtures thereof, and the second reactive functionality is selected from isocyanate and epoxy functionalities.

21. The method of claim 13, wherein the first reactive functionality is a hydroxyl functionality, and the second reactive functionality is an isocyanate functionality.

22. The method of claim 13, wherein the first reactive functionality is selected from isocyanate and epoxy functionalities, and the second reactive functionality is selected from hydroxyl, amino, and carboxyl functionalities, and mixtures thereof.

23. The method of claim 13, wherein the chromophore is covalently bonded to the S portion of the amphipathic copolymer.

24. The method of claim 13, wherein the chromophore is covalently bonded to the D portion of the amphipathic copolymer.

* * * * *